Oct. 27, 1936.    G. M. SHERRIFF    2,058,731
GRANITE CUTTING MACHINE
Filed Aug. 29, 1934    2 Sheets-Sheet 1

Inventor
George M. Sherriff

Oct. 27, 1936.   G. M. SHERRIFF   2,058,731
GRANITE CUTTING MACHINE
Filed Aug. 29, 1934   2 Sheets-Sheet 2
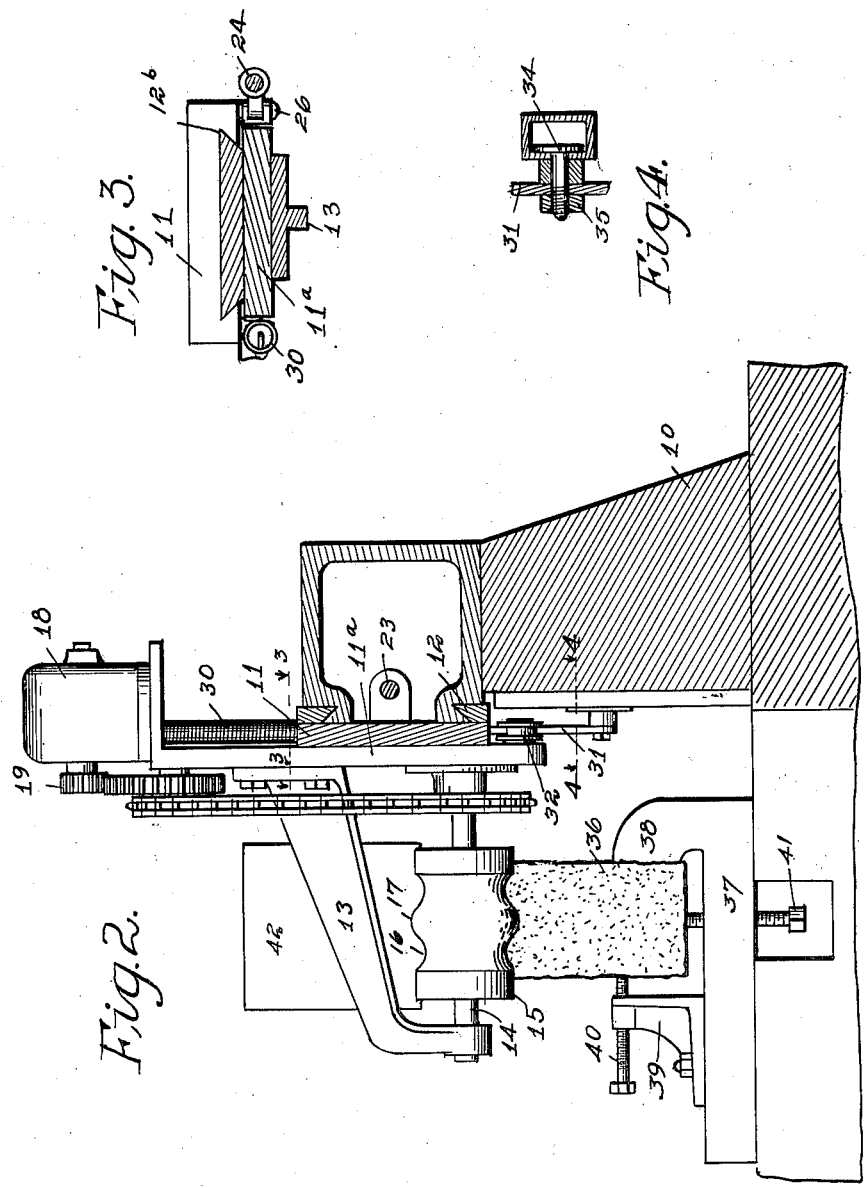

Patented Oct. 27, 1936

2,058,731

UNITED STATES PATENT OFFICE 2,058,731

GRANITE CUTTING MACHINE

George M. Sherriff, Des Moines, Iowa

Application August 29, 1934, Serial No. 742,020

3 Claims. (Cl. 51—100)

My object is to provide a granite cutting machine of simple and durable construction, capable of cutting away a surface of a block of granite to any desired depth, in a short space of time and without any manipulation of the machine by the operator.

A further object is to provide a machine of this class capable of accurately cutting a surface of a granite block in designs other than flat, such as a surface formed with ribs and grooves.

A further object is to provide an improved method of granite cutting by which the speed and accuracy of the cutting is greatly increased, the wear upon the machine minimized, and the necessity for manipulating the machine during the cutting of a surface eliminated.

My invention consists in the construction, arrangement and combination of the various parts of the device, whereby the objects contemplated are attained, as hereinafter more fully set forth, pointed out in my claims, and illustrated in the accompanying drawings, in which:

Figure 2 shows a vertical sectional view on the line 2—2 of Figure 1.

Figure 3 shows a detail sectional view on the line 3—3 of Figure 2; and

Figure 4 shows a detail sectional view on the line 4—4 of Figure 2.

Figure 1:
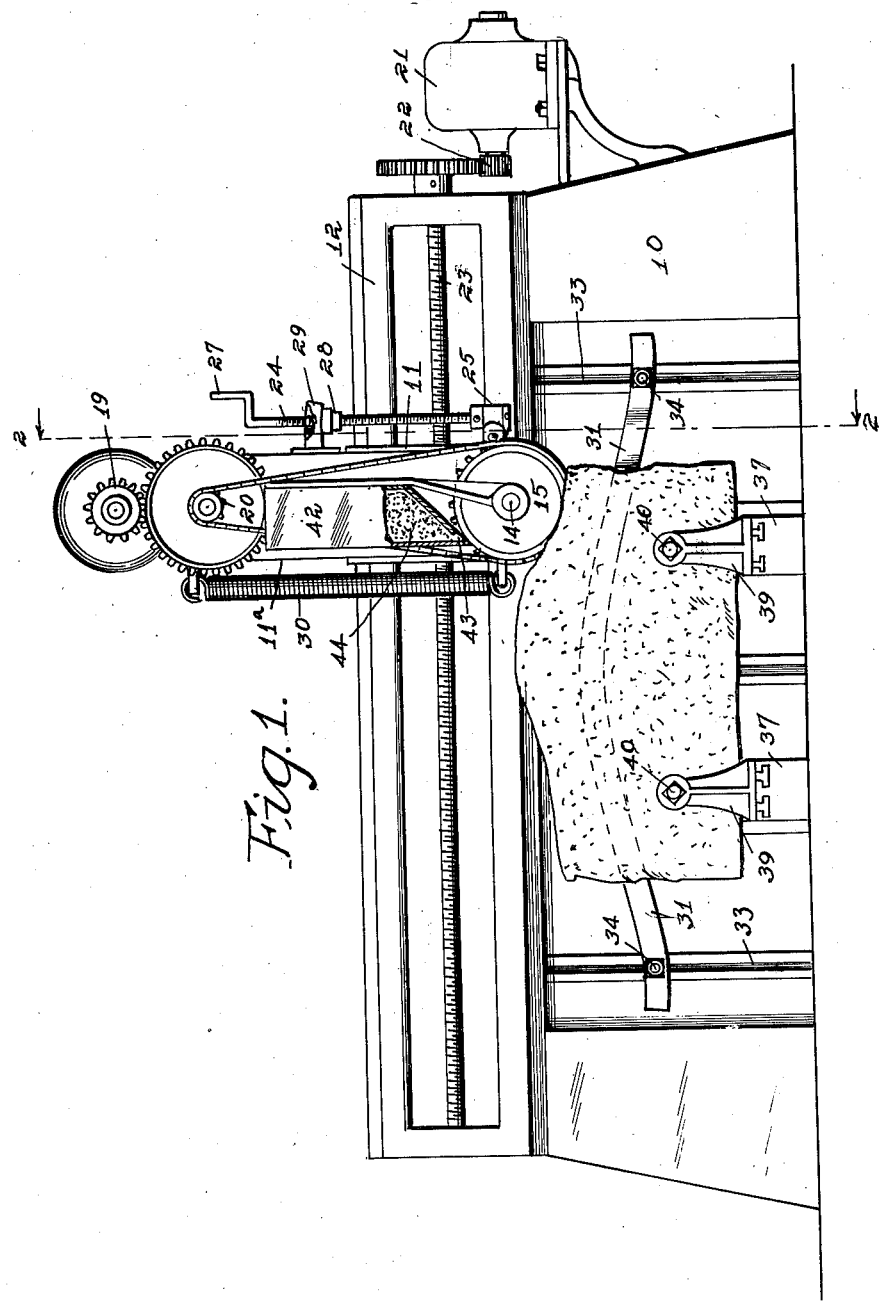
Figure 1 shows a side elevation of a granite cutting machine embodying my invention and illustrating a block of granite supported therein.

Referring to the accompanying drawings I have used the reference numeral 10 to indicate generally the frame of the machine.

11 indicates generally a movable carriage with guide ribs 12 mounted in longitudinally arranged grooves on one side of the upper portion of the frame 10. A vertically movable carriage 11a is mounted to the carriage 11 and has ribs 12b running in grooves in the carriage 11, as shown in Figure 3. Mounted on this carriage 11a is an arm 13 extended laterally from the machine frame and supporting the outer end of a rotatable shaft 14, the other end of which is mounted in a bearing on the carriage 11a. Mounted upon this shaft is a cylinder 15, preferably formed of mild steel. This cylinder may, if desired, be provided with circumferential grooves and ribs 16 and 17, or it may be made in the form of a true cylinder.

Mounted upon the movable carriage is a motor 18. The motor is operatively connected to the shaft 14 by a suitable speed reducing device comprising cogs 19 and sprockets 20. The motor may be reversed to drive the cylinder 15 in either direction.

For driving the carriage 11 longitudinally of the frame I have provided a motor 21 connected by the gears 22 of the screw threaded shaft 23 seated in and extending longitudinally of the carriage 11. This motor may be reversed to drive the carriage 11 longitudinally in both directions.

For moving the carriage 11a vertically relative to the carriage 11 I have provided a screw threaded shaft 24 with its lower end rotatably mounted in a collar 25, which collar is hinged at 26 to the carriage 11a. Its upper end is provided with a crank 27, and a nut 28 is mounted on the rod 24.

Fixed to the carriage 11a is a slotted arm 29 into which the screw threaded rod 24 may be placed, and then when the crank 27 is turned, the vertically moving carriage 11a may be raised.

To lower the vertically moving carriage 11a the screw threaded rod 24 is swung outwardly away from the arm 29, whereupon the carriage 11a is free to move downwardly.

For applying a yielding downward pressure to the vertically moving carriage 11a I have provided a contracting coil spring 30 connected at its upper end to the movable carriage 11a and its lower end to the movable carriage 11.

When it is desired to guide the movement of the rotary cutter cylinder in its longitudinal movement either in a straight line or through an irregular path, I provide a pattern bar 31 fixed to the main frame, and a grooved roller 32 carried by the vertically moving frame 11a, which roller travels upon the top surface of the pattern 31.

The main frame is provided at its front with vertically arranged channels 33, in which are slidingly mounted bolts 34 which support the pattern 31 and to which the patterns are firmly held by the nuts 35.

For supporting a block of granite 36 in proper position relative to the cutter cylinder I have provided a base member 37 having a jaw member 38 at one side, and on this base there are slidingly mounted two jaw members 39, and on each of the jaws 39 there is a bolt 40 extending toward the jaw 38, and on the base 37 there are bolts 41 extended upwardly to engage the base of the granite block. By this arrangement the granite block may be firmly held between the jaws and readily and easily adjusted to any desired position.

Carried by the arm 13 is a hopper 42 having a slotted opening at 43 to discharge its contents in a fine stream extending the full length of the cutter cylinder. In this hopper I place a quantity of small metallic bodies 44. These metallic bodies are preferably of mild steel and about the size of commercial sand, and in this hopper there is also contained water mixed with the small metallic bodies.

In practical operation with my improved machine I have demonstrated that when the parts are arranged in the position shown in the drawings, and the cutting cylinder rotated and a constant stream of the small metallic bodies and water is flowing between the cylindrical cutter and the granite block, and a sufficient amount of downward pressure is applied to the cylinder, then the small metallic bodies will be moved with the cylinder and discharged from the side of the cylinder that is moving away from the granite. During this movement the small metallic bodies, if they are of irregular outline, will at times become very forcibly pressed toward the adjacent part of the granite, sufficiently so to cause the granite at that point to be crushed and chipped off, very similar to the manner in which granite is chipped by hand with a chisel.

I have also found in practice that if the small metallic bodies are round they will produce the same result, due to the fact that the granite surface itself is of irregular, chipped off outline, and at times some of these round metallic bodies will be engaged with crushing force between the cylinder and the granite and will effect crushing and chipping off small particles of the granite.

I have demonstrated that by using small metallic bodies made of mild steel, that they are so much softer and tougher than the granite that they will not become broken or distorted in this cutting action, and in addition to this I have demonstrated that with these mild steel bodies in contact with the mild steel cylinder, there is practically no abrasive action on appreciable wear upon the cylinder during a long period of granite cutting. Due to this fact it is possible, with my improved cutter, to cut the surface of a piece of granite with an irregular outline, and in the drawings I have illustrated circumferential grooves and ribs formed in the cylinder so that when thus used the surface of the granite block being treated is given a pattern corresponding to the irregular outline of the cylinder.

My improved method of granite cutting consists in placing between a rotating cylinder and the granite block a quantity of small metallic bodies made of a material softer and tougher than the granite, and then applying to these small bodies a sufficient amount of pressure applied through the cylinder to move these metallic bodies in contact with the cylinder, from one side of the cylinder where it contacts with the granite to the opposite side where it discharges the small metallic bodies and chipped granite, and during this short period of travel in contact with the granite, applying sufficient pressure to these small metallic bodies so that at times they will engage the face of the granite block with such crushing force as to crush and chip off small particles of the granite block and thereby cut away the granite block much faster than can be done with any of the so-called granite grinding machines and devices now in use.

With my improved method the cylinder need be advanced across the face of the granite block only once as the granite is chipped off to the proper depth during this one movement, thereby dispensing with the necessity of having an attendant constantly changing or moving the grinding element.

I am aware that at the present time there is in general use two forms of granite grinding devices. One employs a cylinder made of carborundum or other material harder than the granite. This cylinder is rotated against the surface of the granite in a manner somewhat similar to that employed by me, but with this method the action is simply that of grinding away the high spots of the granite block, and since the carborundum cylinder is, like the granite, hard and brittle, these carborundum cylinders are rapidly worn away. Hence, with these carborundum cylinders it would be impractical to provide grooves and ribs as I have illustrated and described, because with the rapid wearing away of the carborundum cylinders the pattern thereof would be soon destroyed, whereas, with my improved device the surface of the mild steel cylinder remains intact during a long period of use.

Furthermore, with a grinding cylinder made of material harder than the granite, it would be impractical to apply such pressure to the cylinder against the granite as is necessary to perform the crushing and chipping off action which I have described, due to the fact that such pressure would crush and break the carborundum cylinder itself.

This difference in principle between my apparatus and method and the method now in use in which carborundum cylinders are employed is strikingly illustrated by the fact that at the present time the operator first cuts away the surface of the granite block to be treated, to within ⅛th of an inch of accuracy, and the carborundum cylinder is employed only to smooth up the surface, whereas, with my improvement, I have found that I can cut away at least an inch and a half off of the top of a granite block in one movement across the top of the block with the cutting cylinder moving across the block at a speed of about two inches a minute.

I have also found that with my improved machine and method the entire surface of the block may be treated at one operation without any attention on the part of the operator.

Another important advantage of my machine and method over the carborundum machines is that, with the carborundum grinders it is necessary to constantly move the grinder cylinder over the granite block from end to end, whereas, with mine, the cutting mechanism moves only once across the block and cuts to the full depth required during this single movement.

I am also aware that there is in use at the present time a type of granite grinding machines consisting of a flat disc and means for rotating this disc with its flat surface against the surface of the granite rock being treated, and when this disc apparatus is employed it is the common practice to provide an abrasive substance and water between the flat disc and the granite surface being treated. I am also aware that for this abrasive substance there has been used small particles of steel, sand and the like. However, with this disc apparatus the operator is required to constantly move, by hand, the disc back and forth across the surface of the granite, and as the granite is ground off, the particles of granite become mixed with the abrasive and make a pasty-like substance.

I am not aware, however, that with this said disc device there has ever been such pressure applied by the disc upon the small abrasive bodies as would cause said bodies to crush and chip off particles of the granite. On the contrary, they simply function in the ordinary grinding and polishing manner. Furthermore, with the disc machines the waste from the granite is not discharged in the same manner as with my device, and its presence greatly slows up the grinding process.

The end surfaces of the granite block may be cut away in the same manner as the top surface, without readjustment of the granite block in its clamping jaws; and when it is desired to do this, the cutting cylinder is supported at the top surface of the end and is moved straight downwardly to the bottom of the granite block, and when it is desired to treat the other end of the block the movement is the same, except that the direction of the rotation of the cutting cylinder is reversed.

By the use of the term "granite" as herein employed I wish to be understood as referring generally to all kinds of stone having the same characteristics as granite blocks.

In my use of the machine thus far I have found that mild steel is satisfactory for the cutting cylinder and the mass of small cutting bodies, and I have found that the cylinder and small bodies should be of material softer and tougher than granite in order to function properly. However, I do not wish to be understood as limiting my invention to the use of the specific material, mild steel, but intend that it should cover other substances having substantially the same characteristics as mild steel.

I claim as my invention:

1. In a granite cutting machine, the combination of a frame, a roller supported by the frame, means for rotating the roller, means for supporting a granite block, means for advancing the roller relative to the block, a guide device for limiting the movement of the roller toward the block and yielding pressure means for forcing the roller toward the block, and a quantity of small particles of material softer and tougher than granite, and means for feeding same and water between the roller and block.

2. In a granite cutting machine, the combination of a frame, a roller supported by the frame, means for rotating the roller, means for supporting a granite block, means for advancing the roller relative to the block, a guide device for limiting the movement of the roller toward the block and yielding pressure means for forcing the roller toward the block, and a quantity of small particles of material softer and tougher than granite, means for feeding same and water between the roller and block, and means for rotating the roller in such direction relative to the block being cut that as the cutting proceeds the waste granite and said bodies will be moved thereby downwardly and away from the cutting area toward which the roller is being advanced.

3. In a machine of the class described, the combination of a frame, a roller supported by the frame, means for rotating the roller, means for supporting a block, means for causing a relative advance movement of the roller, and block to be cut, to progressively bring the surface of the block into contact with the roller, a guide device of irregular outline for limiting the movement of the roller toward the block, means for forcing the roller toward the block, said means being yieldable to permit movement of the roller away from the block, a quantity of small particles of material, and means for feeding them between the roller and the block, said particles being of relatively hard and tought material.

GEORGE M. SHERRIFF.